United States Patent Office 3,181,926
Patented May 4, 1965

3,181,926
COLORING OF POLYMERIC SHAPED
STRUCTURE SURFACES
Robert Marion Busche, North Graylyn Crest, Del., assignor to E. I. du Pont de Nemours and Company, Wilmington, Del., a corporation of Delaware
No Drawing. Filed Nov. 20, 1961, Ser. No. 153,697
9 Claims. (Cl. 8—4)

This invention relates to a process for coloring articles fabricated from high polymers.

It is well known that articles fabricated from high polymers usually are not receptive to paints, adhesives and the like which are applied to the surface of the article as ornamentation or in order to protect it against sunlight and atmospheric weather conditions or to laminate the article to a second material. In the past, articles fabricated from polymeric materials have been treated in a variety of ways including chemical etching, irradiation, partial solubilization in a resin solvent, melting and flaming in order to impart adherability to the surface.

It is an object of the present invention to provide a process for coloring articles which have been fabricated from polymeric materials. It is a further object to provide a proces whereby either all or only selected portions of the surface of the polymeric article may be so colored. It is a further object to provide a coloring process which is economically feasible. Other objects will become apparent hereinafter.

The objects of the present invention are achieved by means of a process wherein a slurry containing a multitude of finely-divided abrasive particles is directed at high velocities by a suitable pneumatic or hydraulic means at the polymeric surface of the article which is to be treated, said abrasive slurry containing therein an organic dye which is absorbed by the substrate being colored. The abrasive slurry containing the dye is directed at the shaped surface with sufficient velocity to simultaneously abrade the surface, so as to increase its effective area and form a more porous structure, and, also, to provide forceful contact between the dye solution and the polymer to facilitate transfer of the dye from the solution to the surface. In addition to imparting the desirable color to the object, the process, also, provides a decorative matte finish. Because of the necessity for achieving abrasion of the shaped surface, the polymer substrate must be sufficiently soft to make it susceptible to particle penetration. Conversely, it may be stated that the abrasive particles must be sufficiently hard to penetrate the polymer surface. Substrates which are appropriate for coloring include those fabricated from both thermosetting and thermoplastic resins, for example, phenol-formaldehyde, urea - formaldehyde, melamine-formaldehyde, silicone and epoxy resins as well as polyamides, polyesters, polyethers, polyoxyalkylidenes and vinyl polymers such as the acrylics, vinyl ester polymers, hydrocarbon polymers and the like. Especially suitable for coloring by means of the present invention are shaped structures having surfaces comprising such polymers as polyethylene, polypropylene, polyacrylics and methacrylics, polyoxymethylenes, for example, "Delrin" acetal resin and the like. Abrasives which are commonly used include the finely-divided carbides which are noted for their hardness, especially the silicon, niobium, hafnium, tantalum, and tungsten carbides, the aluminum oxides and the various silicas and glasses. Examples of the above include Carborundum, corundum, Alundum, quartz and pumice. The concentration of abrasive in the slurry is not critical except that fluidity must be maintained to facilitate handling. In general, the concentration is held between 10 and 50 percent of the carrier weight and usually between 35 and 45 percent.

Any suitable means may be employed to motivate the dye-containing, abrasive slurry so as to generate the high velocities required. A jet stream of air or any appropriate gas as well as hydraulic motivation may be utilized. An example of a commercial apparatus by means of which the present invention can be carried out is the "Liquamatte," forced air-motivated, abrasive slurry dispenser produced by the Lord Chemical and Equipment Division, Wheelabrator Corporation, York, Pennsylvania.

The dyes employed herein must be capable of being absorbed by the polymeric surface being colored. In general, this prerequisite is met by a wide variety of organic dyes such as those, for example, of the direct, vat, solvent, disperse, acid and basic types. Although some of these types are used in the art for the coloration of some of the polymers disclosed hereinabove, the methods of dyeing are quite unlike that of the present invention. Some, for example, require lengthy soaking of the substrate while others, such as those using solvent dyes, usually require that the dye be incorporated directly into the polymer. Either of these methods are most used only where complete coloration is desired. Examples of the dyes operable herein have been selected from the six aforementioned dye types and include Trypan Blue BPC, C.I. 23850, Diamine Green B, C.I. 30295, Indanthren Rubine R, C.I. 70320, Aniline Yellow, C.I. 11000, Celanthrene Pure Blue BRS, C.I. 64500, Fast Red A, C.I. 15620, and Auramine SP, C.I. 41000. Additional available dyes which are suitable in the present invention include the "Tintex" type household dyes. The amount of dye required varies between 0.1 and 50 weight percent of the slurry carrier, but normally is limited to the range from 1 to 25 percent and most frequently, 5 to 10 percent. Preferably, the slurry carrier should be a liquid in which the surface of the shaped structure to be treated is insoluble or at least very limitedly soluble so as to preclude solvent attack and deterioration of the surface. Water frequently is utilized as a carrier liquid because of its economic and safety features. Wetting or dispersing agents may be added to the water to facilitate solubilization and/or dispersion of the dye as well as to enhance its contact with and penetration of the abraded shaped surface.

The time required to complete the coloring process will be determined by the nature of the polymer surface treated and the dye used, the abrasive, the temperature of treatment and the velocity with which the dye-abrasive mixture strikes the surface. In general, for simple surfaces, the coloring can be effected in from 30 seconds to 2 minutes, thus making the process especially amenable to a continuous operation. Shades of a given color, likewise, can be obtained by variation of the length of treatment. The temperature of the dye-abrasive mixture is controlled between room temperature and the boiling point of the slurry medium or the softening point of the shaped surface, whichever is lower. In most cases, especially when water is employed as the medium, the temperature is held within the range of room temperature to 100° C. The process is useful not only for providing a completely colored matte surface but, by means of suitable masks, may be employed to produce multi-colored effects, lettering, designs and the like.

The following examples are intended to demonstrate but not limit the usefulness of the invention.

*Example 1*

Six and sixteen ounce cylindrical, screw cap, plastic bottles fabricated from a branched polyethylene, a substantially linear high density polyethylene and polypropylene are treated at room temperature in a "Liquamatte" machine with the following aqueous abrasive-dye mixtures containing 10 percent dye and 40 percent abrasive (by weight) in the water.

| Abrasive | Dye |
|---|---|
| 200 mesh, refined, crushed, Arkansas stone. | Fast Red A. |
| Do | Fast Red A containing 0.1 weight percent (based on carrier) sodium salt of sulfonated oleic acid. |
| 325 mesh, refined, crushed, Arkansas stone. | Aniline Yellow. |
| 150 mesh, high purity aluminum oxide. | Fast Red A. |
| Do | Indanthren Rubine R. |
| Do | Auramine SP. |
| Do | Celanthrene Pure Blue BRS. |
| 100 mesh, refined, crushed quartz | Diamine Green B. |

The bottles are colored uniformly and permanently corresponding to the dye employed, in about 30 seconds.

*Example II*

Various shaped polymeric structures are treated using Fast Red A with the conditions as in Example I, except where noted:

| Surface | Abrasive | Temperature, °C. | Effect |
|---|---|---|---|
| Polyethylene | None | 20 | None. |
| Do | do | 100 | Very faint after 4 mins. |
| Polyoxymethylene. | 100 mesh, refined, crushed, Arkansas stone. | 100 | Colored in 30 secs. |
| Do | 100 mesh, refined, crushed quartz. | 100 | Do. |
| Polymethylmethacrylate. | 80 mesh, refined, crushed quartz. | 100 | Do. |

The shaped polymeric surfaces which are colored hereinabove are fabricated by conventional molding or extrusion procedures, but principally by means of standard injection molding techniques.

I claim:

1. An abrading-coloring process for shaped polymeric surfaces comprising subjecting shaped polymer surface to a high velocity bombardment of finely-divided abrasive particles suspended in a carrier liquid which contains therein an organic polymer-dye of a type selected from the group consisting of direct, vat, solvent, disperse, acid and base type organic dyes.
2. A process according to claim 1 wherein said abrasive particles comprise 10 to 50 weight percent and said organic polymer-dye comprises 1 to 25 weight percent of the carrier liquid.
3. A process according to claim 1 wherein said abrasive particles comprise 35 to 45 weight percent and said organic polymer-dye comprises 5 to 10 weight percent of the carrier liquid.
4. A process according to claim 1 wherein said carrier liquid is water.
5. A process according to claim 1 wherein the water contains a dispersing agent.
6. A process according to claim 1 wherein said shaped polymer surface is polyethylene.
7. A process according to claim 1 wherein said shaped polymer surface is polypropylene.
8. A process according to claim 1 wherein said shaped polymer surface is a polyoxymethylene resin.
9. A process according to claim 1 wherein said shaped polymer surface is an acrylic polymer.

References Cited by the Examiner
UNITED STATES PATENTS

| | | | |
|---|---|---|---|
| 474,814 | 5/92 | De Coetlogon | 8—4 |
| 2,325,060 | 7/43 | Ingersoll. | |
| 2,785,478 | 3/57 | Audas et al. | 8—151 XR |
| 2,964,852 | 12/60 | Doleman et al. | 8—151 XR |
| 3,042,480 | 7/62 | Chipalkatti et al. | 8—151 |

NORMAN G. TORCHIN, *Primary Examiner.*
MORRIS O. WOLK, *Examiner.*